Feb. 4, 1964  J. BUTALA, JR  3,120,062
GAUGING DEVICE AND METHOD FOR MACHINING OPERATIONS
Filed May 17, 1961

INVENTOR.
JOHN BUTALA, JR.
BY
*Isler & Ornstein*
ATTORNEYS 3,120,062
GAUGING DEVICE AND METHOD FOR
MACHINING OPERATIONS
John Butala, Jr., 133 S. Willow St., Kent, Ohio
Filed May 17, 1961, Ser. No. 110,718
1 Claim. (Cl. 33—169)

The present invention relates generally to the art of establishing reference points or locations for the accurate and precise machining of workpieces and, more specifically, to devices in the nature of center-finders but designed and particularly adapted for use on the flat surfaces and straight edges of the pieces which are to be machined.

In precision machine work in which machine tools, such as jig borers, milling machines, boring tools and similar rotary spindle machining equipment, are used, it is necessary that one portion of the work piece be established as a reference point or surface from which the dimensional requirements and location relationships of other machined areas can be accurately determined in accordance with the drawings or other machining directions which are provided to the machinist. Accordingly it is good practice to grind or otherwise finish-machine at least a portion of an edge surface of the workpiece to provide such a reference base or line. The reference base or line must then be brought into registry or correspondence with the center-line of the tool-holding chuck or spindle so that the subsequent machining operations can be related back to the reference surface. The degree of accuracy to which the reference line and the tool center-line can be brought into registry or alignment is a determining factor in the ultimate precision of location of the machined areas and the extent to which inherent deviations in location dimensions can be minimized.

Heretofore, it has been the practice to attempt to align the edge surface of the workpiece with the machine tool spindle by means of devices such as a cylinder mounted on the spindle or a ball mounted on the spindle (in some forms called a "wiggler") both of which depend upon a visual approximation by the machinist of the exact point of contact of the periphery of the cylinder or ball with the reference surface. The machinist then must compute the position of the tool spindle center-line based upon the determined dimension of the cylinder or ball which has been utilized for the surface contact. Not only must the machinist rely upon his visual and tactile senses for an approximation of the contact point, but he must also visually detect any lack of concentricity which may exist in the contact devices or in the tool spindle itself and attempt to make some compensation for such eccentricity in his computation, provided he is even able to visually detect such eccentricity. Direct physical alignment of the tool spindle and the reference edge is not attempted by these known methods and they necessarily resolve themselves into visual approximations which often fall short of the precision of location which is sought after.

It is the primary object of my invention to provide an improved method of alignment of the tool spindle and the reference edge surface of a workpiece.

Another object of my invention is to provide an alignment method of the character described which permits direct physical alignment of the tool spindle and the reference edge surface.

A further object of my invention is to provide a centering device or gauge for effecting alignment of a machine tool spindle and a reference edge surface of a workpiece to be machined.

Other objects and advantages of my invention will be apparent during the course of the following description.

In the accompanying drawings forming a part of this specification and in which like numerals are employed to designate like parts throughout the same, FIG. 1 is a front elevation of a gauge, embodying the features of my invention, mounted on a work piece, a portion thereof being broken away to show interior detail.

Referring more particularly to the drawings, I have shown a work piece W which is required to be precision machined by a machine tool such as a jig borer or the like. As previously explained, at least one and preferably two adjacent edge surfaces such as the surfaces designated A and B, or a marginal portion thereof, should be ground, milled or otherwise finish machined to provide a reference plane for the accurate locating of the further machining work.

The workpiece W is clamped or otherwise suitably secured to the worktable (not shown) of the machine tool, in accordance with conventional practice. A gauging or aligning device 10 is provided to be mounted on the finished surface or reference plane. This is shown as the surface A in FIG. 1, the surfaces A and/or B in FIG. 3 and the surface B in FIG. 4. The gauging device 10 can be made small enough in size so that it will be usable on relatively short or narrow reference surfaces, although it is contemplated, that for convenience in use, it is preferable that the device be made in two or three sizes. It will be further noted as the description proceeds, that the device 10 is provided with a contact surface which is especially adapted for use on a very narrow reference plane.

The device 10 is illustrated as being formed of two joined pieces or blocks 11 and 12. The material utilized for the blocks should be substantially rigid and stable in character and would ordinarily be a metal such as steel, aluminum or stainless steel. However, for particular conditions, it may be desirable to use glass, granite, Micarta or other non-metallic material. It is also to be noted that the device 10 could be made as a single unitary piece instead of joining two pieces. However, as will hereinafter fully appear, it is extremely advantageous and desirable, both from the standpoint of accuracy and from the standpoint of manufacture, that the device be made of two pieces. In the description which follows the terms top, bottom, side, etc., when used, will refer to the position of the device as shown in FIG. 1, and are merely employed as convenient terms of reference.

Figure 1:
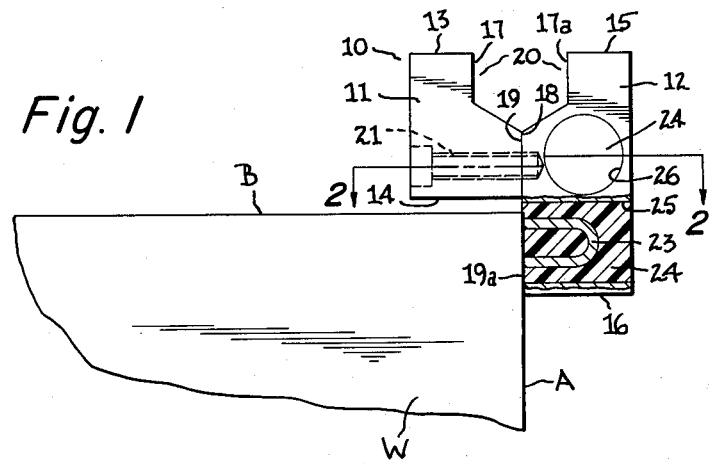
Figure 2:
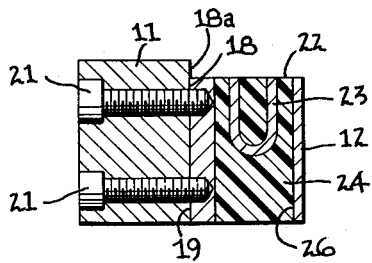
FIG. 2 is a cross-sectional view taken on line 2—2 of FIG. 1.

As seen in FIGS. 1 and 2, the piece or block 11 has a shorter length or height from its top 13 to its bottom 14, than does the piece 12, from its top 15 to its bottom 16. Each of the pieces has a substantially rectangular cross-section, but each has a portion thereof removed, intermediate their top and bottom surfaces, to provide a gauging wall or face 17. The face 17 is preferably disposed in a vertical plane parallel to a surface 18 on block 11 and surface 19 on block 12 which becomes abutting surfaces when the blocks are joined in assembly. Such a portion of the gauging face is indicated at 17a. However, the gauging face 17 may also be in an inclined plane such as indicated by the portion at 17b. When the pieces 11 and 12 are joined in abutment, their opposed gauging faces 17 define a centering gap 20.

One of the advantages of the device 10 is that the absolute dimension of the gap 20 is not of any critical importance and, in fact, a knowledge thereof is not essential to the manufacture of the device nor to its utilization. It is of extreme importance, however, that, regardless of its dimensions, the gauging faces 17 and the gap 20 defined therebetween be absolutely symmetrical with respect to the central plane defined by the abutting surfaces 18 and 19. To this end, both blocks 11 and 12 should be machined simultaneously on the same set-up so that the like surfaces 17, 18 and 19 are co-planar, thus providing absolute symmetry of the gauging gap 20 when the blocks are assembled. It may be noted that such machining or forming may be applied, if desired, to a unitary bar of material which is subsequently cut into two pieces to provide the blocks 11 and 12.

The blocks 11 and 12 may be joined in any suitable manner such as, for example, by hollow head cap screws 21 which extend through the block 11 and threadedly engage the block 12. The assembled blocks are provided with contact faces for abutting the reference plane of the work piece, these contact faces having a smooth finish and lying in planes parallel or normal to the central symmetry plane 18, 19. One of such faces is the bottom surface 14 of block 11; others are the vertical extension 19a of the surface 19 on block 12, the rear surface 22 of block 12 and the lateral extension 18a of the surface 18 of block 11.

Means are provided for holding the selected contact face in abutment with the reference plane of workpiece W. Such means may take any suitable form such as clamps, suction ports, etc., but I have here illustrated such means as being permanent magnets 23 mounted in a matrix of resin 24 in each of a pair of bores or recesses 25, 26 in the block 12. The poles of the magnets are each flush with the respective contact faces 19a and 22 in which recesses 25 and 26 are provided. As can be observed, the faces 19a and 22 lie in planes normal to each other. The magnet type of holding means is most convenient for ferrous workpieces, such as steel, which comprises the most usual type of workpiece material.

Figure 3:
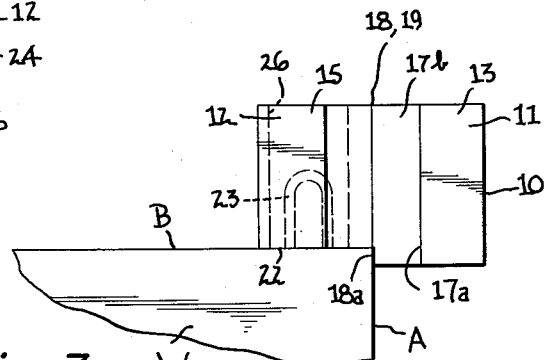
FIG. 3 is a view in elevation, similar to FIG. 1, but showing another position in which the gauging or aligning device may be utilized.

In utilizing the device 10, it is held in abutment with reference plane of the work as shown in the drawings. In FIG. 1 the device is shown mounted with its contact face 19a in abutment with the reference surface A. If the surface B were also a finished surface, the contact face 14 could also be brought into abutment with the surface B. In FIG. 3 the device is shown in a position where both surfaces A and B are reference planes and are contacted respectively by the contact faces 18a and 22. It will be noted that the contact face 18a permits the device to be utilized under circumstances where the surface A provides only a very narrow reference plane which could not be accurately contacted by a relatively larger surface such as contact face 19a. With the device in the position of FIG. 1 or FIG. 3, alignment can be accomplished with spindle center-line of machine tools having either vertically or horizontally disposed spindles.

Figure 4:
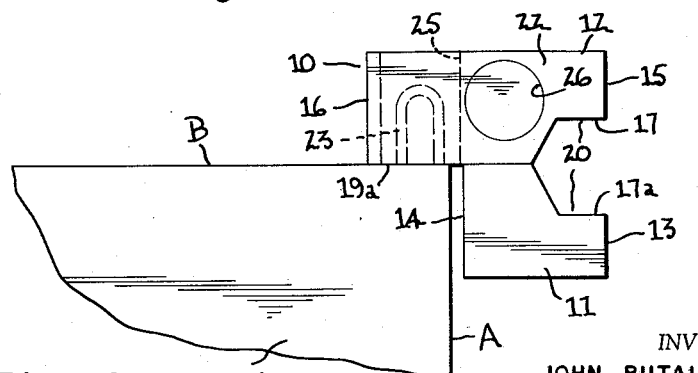
FIG. 4 is a view in elevation showing still another position of utilizing the device.

In FIG. 4, the contact face 19a abuts the reference surface B and the gap 20 is so disposed that it is intended for the centering of horizonally extending spindles. Thus, the device lends itself to a variety of positions, one of which can be selected for the particular centering condition which is encountered.

After the device has been mounted in the desired position, a conventional dial indicator gauge which has been mounted on the tool spindle is brought into sensing proximity to the gap 20. The tool spindle is slowly rotated and the position of the workpiece W is adjusted until the dial indicator reading shows, by contact with the gauging walls 17, that the spindle is exactly centered in the gap 20 and thus the theoretical spindle axis is coincident and aligned with the central plane 18, 19 which, in effect is an extension of the reference plane A or B on the workpiece. This trammelling method requires no computation and no absolute measurement, because it does not depend on dimension, but only on equi-distance relative to gauging surfaces which are symmetrical with respect to the reference plane of the workpiece. By the use of the two equidistant gauging surfaces 17, the need for reliance on visual or tactile senses as to the point of contact with the reference plane is eliminated and exact alignment is assured as there is no inherent plus or minus deviation in the device. Any consistent inaccuracy which may exist in the absolute dimensional readings given by the dial indicator as it sweeps the gap 20 is not of concern to the machinist, as he is only concerned with equidistance and not with absolute dimension. Furthermore, inasmuch as the centering method relates to the alignment of the reference plane with the theoretical axis of the tool spindle, any deformation or lack of concentricity or other slight inaccuracies in the spindle itself are inherently divided out and thus compensated for. As previously noted, the absolute dimension of the device 10 is not a relevant factor in the use of my method. Thus, I have eliminated dimensional variations as a source of inaccuracy and am able to effect spindle alignment to an edge surface with extreme accuracy approaching zero deviation.

It is to be understood that the form of my invention, herewith shown and described, is to be taken as a preferred example of the same, and that various changes in the shape, size and arrangement of parts may be resorted to, without departing from the spirit of my invention, or the scope of the subjoined claim.

Having thus described my invention, I claim:

An edge-locating device of the character described, comprising a first block, a second block, a plane abutment surface common to said blocks provided thereon, a plane gauging surface provided on each of said blocks and uniformly angularly inclined relatively to said plane abutment surface in opposite directions, means for securing said blocks in abutment with each other along said plane abutment surface to dispose said gauging surfaces in absolute symmetry relatively to the plane of said abutment surface, and means for retaining said abutment surface of one of said blocks in planar contact with an edge surface of a workpiece.

References Cited in the file of this patent

UNITED STATES PATENTS

| | | |
|---|---|---|
| 1,953,614 | King | Apr. 3, 1934 |
| 2,156,500 | Jeschor | May 2, 1939 |
| 2,586,639 | Freimark | Feb. 19, 1952 |
| 2,955,359 | Carpenter | Oct. 11, 1960 |

OTHER REFERENCES

American Machinist, July 19, 1933, page 477, Author Moore.

American Machinist, Sept. 28, 1953, page 151.

Metalwork Production, May 29, 1959, page 959.